Jan. 26, 1971     R. DERC     3,558,997

ELECTRIC CONTROL CIRCUITS FOR ELECTROMAGNETIC DEVICES

Filed Sept. 23, 1968     3 Sheets-Sheet 1

United States Patent Office 3,558,997
Patented Jan. 26, 1971

3,558,997
ELECTRIC CONTROL CIRCUITS FOR ELECTROMAGNETIC DEVICES
Roman Derc, Stoke-on-Trent, England, assignor to English Electric Computers Limited, London, England, a British company
Filed Sept. 23, 1968, Ser. No. 761,581
Claims priority, application Great Britain, Sept. 21, 1967, 42,943/67
Int. Cl. H01h *47/32;* G05f *1/40*
U.S. Cl. 317—148.5                                        6 Claims

ABSTRACT OF THE DISCLOSURE

An electric control circuit for an electromagnetic device such as a clutch or a brake includes a first means for energising the coil of the device to operate the device and a second means for subsequently providing a reverse current flow through the coil whereby rapidly to reduce the energisation of the coil. The first means includes an energising circuit for the coil having a capacitor and a first controlled impedance device which is operable by a control signal to energise the coil and charge the capacitor. The second means includes a discharge circuit for the capacitor and comprises the coil and a second controlled impedance device which operates only when the first controlled impedance device is rendered inoperative. When it is required to reduce the energisation of the coil, the first controlled impedance device is rendered inoperative whereupon the second controlled impedance device automatically operates to discharge the capacitor through the coil to provide the reverse current flow therethrough.

---

This invention relates to electric control circuits for electromagnetic devices such as clutches and brakes.

In driving arrangements employing electromagnetic devices the eddy currents in the magnetic circuits tend to limit the speed of operation of the devices. To reduce the eddy currents to an acceptable level it is common practice to laminate the magnetic circuits. However, when the magnetic circuits are of a complex shape this becomes impractical. By using coils for the electromagnetic devices having a low value of inductance and by supplying the coils from a relatively high voltage source via a resistor and a capacitor, it has been found possible to increase the flux in the magnetic circuits at a satisfactory rate. However, by removing the supply voltage it is usually impossible to reduce the flux at the same rate.

This is particularly the case in driving arrangements where a high speed of operation is required. For example, in high speed line printers where it is required to print, say, 2000 or more lines of characters per minute, it is necessary to advance a web of paper in steps, the advance of the paper being arrested each time a line of characters is to be printed on the paper. The driving arrangement for the web of paper includes a driven shaft whose operation is controlled by one or more electromagnetic clutches and an electromognetic brake. In order to provide satisfactory speeds of operation of the printer it is usual simultaneously to energise one of the electromagnetic devices and de-energise another of the devices. However, the eddy currents in the de-energised electromagnetic device tend to retard the operation of the energised device thereby slowing down the operation of the printer.

According to a feature of the present invention an electric control circuit for an electromagnetic device such as a clutch or a brake, includes a first means operable to energise the coil of the device to a predetermined high level to operate the device and a second means which is subsequently operable to provide a reverse current flow through the coil whereby rapidly to reduce the energisation of the coil.

According to a further feature of the present invention the first means and the second means have a common capacitor which is charged when the first means is operated and discharged through the coil on operation of the second means.

Preferably the first means includes a first controlled impedance device connected in an energising circuit for the coil and the second means includes a second controlled impedance device connected in a discharge circuit for the capacitor and rendered inoperative when the first controlled impedance device is operated, the first controlled impedance device being operable by a control signal to energise the coil and charge the capacitor, and the second controlled impedance device being operated, when the first controlled impedance device is subsequently rendered inoperative, to initiate the discharge of the capacitor through the coil.

According to a still further feature of the invention the electric control circuit is provided with a third means whose operation is controlled by a control signal, the second means being operable to reduce the level of energisation of the coil to a predetermined holding level and the third means being operable, when the energisation is at the holding level, rapidly to de-energise the coil and render the device inoperative by providing reverse current flow through the coil.

An electric control circuit for a driving arrangement for a high speed line printer will now be described, by way of example, having reference to the accompanying drawings in which.

Figure 1:
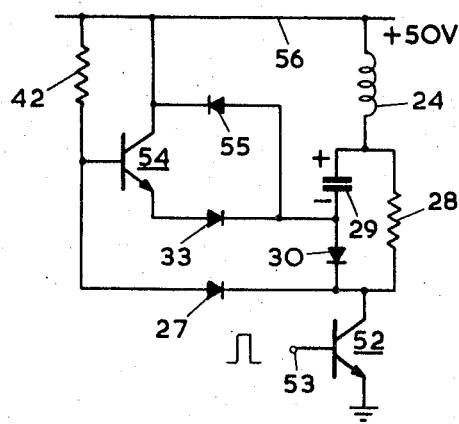
FIG. 1 is a circuit diagram of a control circuit for an electromagnetic clutch or an electromagnetic brake.

The control circuit of FIG. 1 includes a transistor 52 whose operation is controlled by positive-going pulses (START pulses) applied to a signal input terminal 53. The collector electrode of the transistor 52 is connected to a coil 24 through a parallel network consisting of a resistor 28 in one arm and a capacitor 29 serially connected with a diode 30 in the other arm. The other end of the coil is connected to a +50 volt supply line 56. The coil forms part of an electromagnetic clutch or an electromagnetic brake, whose operation is controlled by the circuit of FIG. 1.

A discharge circuit for the capacitor is provided by the coil 24, a transistor 54 and a diode 33. A diode 55 shunts the emitter-collector path of the transistor 54 and the diode 33. The base electrode of the transistor 54 is connected to the supply line 56 through a resistor 42 and to the collector electrode of the transistor 52 through a diode 27.

Figure 2:
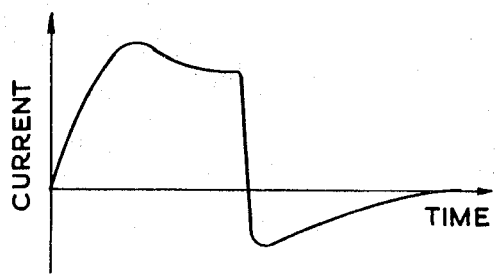
FIG. 2 shows curves used to explain the operation of FIG. 1.

When it is required to energise the coil 24, a START pulse is applied to the transistor 52 to drive it into saturation to provide a current flow through the coil and a resulting flux in the electromagnetic clutch or the electromagnetic brake which rapidly increase as shown in FIG. 2. The current flowing through the coil 24 also flows through the parallel network of the capacitor 29, the resistor 28 and the diode 30 to charge the capacitor, the resistor 28 being provided to maintain the current flow when the capacitor has charged.

The current flowing through the coil and the flux in the clutch or the brake continue to rise until a period of approximately 3 msecs. has elapsed whereupon the clutch or brake is operated. The operation of the transistor 52 is maintained until the coil 24 is to be de-energised. This is effected by removing the START pulse, the base potential of the transistor 52 then being arranged to fall to a level at which the transistor is cut-off so that the current flowing through the coil falls rapidly to zero.

Also, when the transistor 52 is cut-off, the diode 27 is released to allow current flow through the resistor 42 to the base electrode of the transistor 54 to cause it to conduct and provide at the junction of the diodes 30 and 33 a voltage which is equal to approximately +50 volts. The voltage at the junction of the capacitor 29 and the coil 24 is therefore positive with respect to the voltage on the line 56 by an amount equal to the voltage developed across the capacitor during charging. The capacitor 29 now discharges through the coil 24 rapidly to de-energise the coil by providing a reverse current flow through the coil 24 as shown in FIG. 2.

By this means a rapid energisation and de-energisation of the coil is attainable.

This control circuit is particularly advantageous in high speed line printers where a web of paper is advanced in step by step manner past a character drum, characters being printed onto the web of paper each time it is arrested. In such a printer the web is required to be stopped, for example, 2000 times per minute and to perform this operation it is usual to provide a driving circuit including at least one electromagnetic clutch and an electromagnetic brake which are operated in quick succession. During the overlap periods of the flux in the clutch and brake, the power required to operate the clutch and brake and the wear on the faces of the clutch and brake are considerable.

However, by using individual control circuits of the type shown in FIG. 1 to control the clutch and the brake, the flux overlap periods may be considerably decreased thereby providing a large reduction in the power required to operate the clutch and the brake, and in the wear on the faces of the clutch and the brake. Furthermore, the speed of operation of the clutch and brake, and hence the speed of operation of the printer, are also increased.

In some cases it will be required to maintain operation of the clutch or brake for a period which is substantially longer than the period necessary to operate the clutch or brake when using the control circuit of FIG. 1. Although this may be readily performed by providing a START pulse of the required length, it will be appreciated that in such an arrangement a considerable amount of power will be wasted. This is because the level of current required to maintain the clutch or brake in operation is considerably less than the level of current required to operate the clutch or brake.

Figure 3:
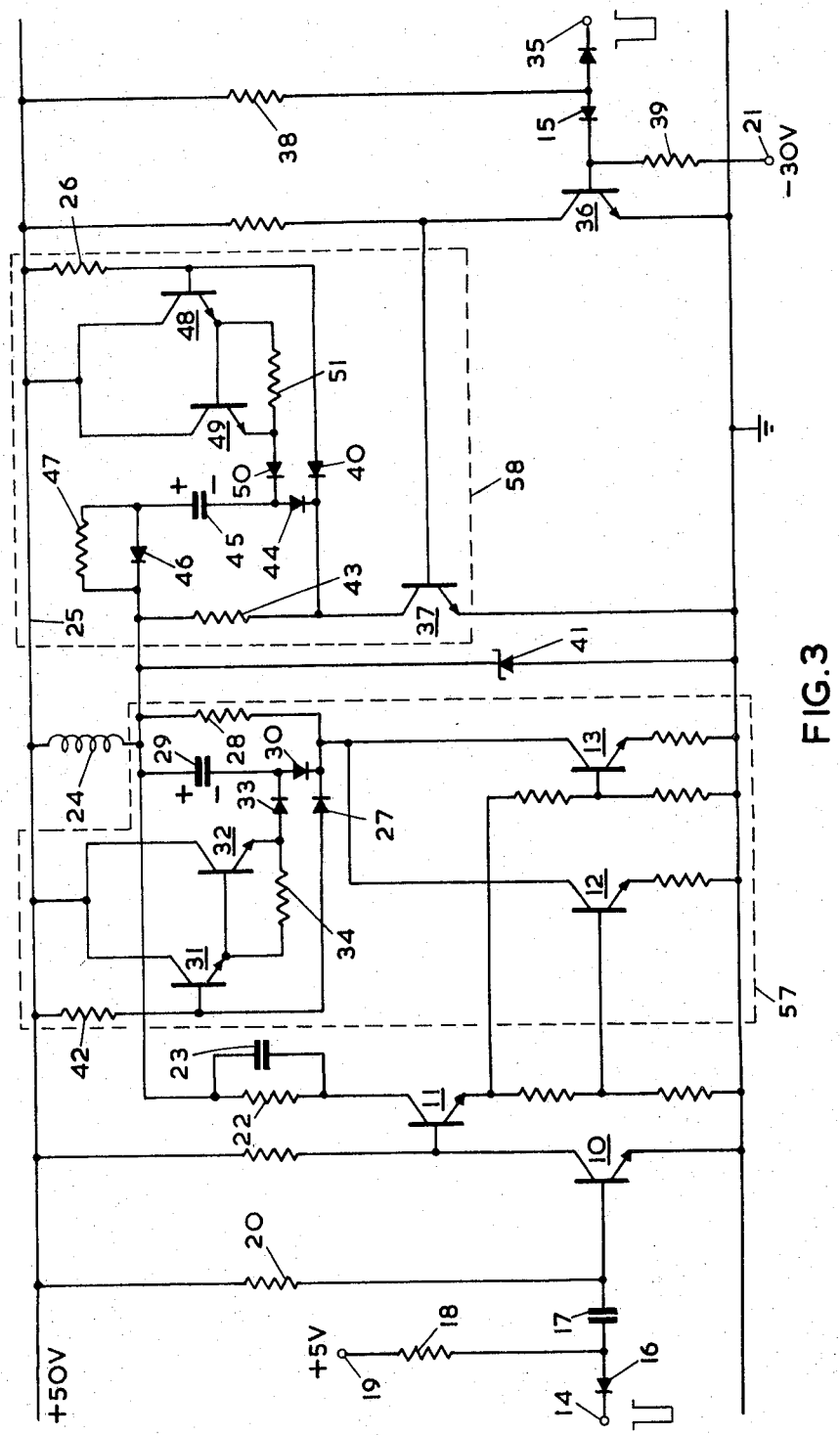
FIG. 3 is a circuit diagram of an alternative form of control circuit for an electromagnetic clutch or an electromagnetic brake.

Accordingly when it is required to maintain operation of the clutch or brake for a long period the control circuit is preferably of the type shown in FIG. 3. In this circuit there is provided a START circuit 57 and a HOLD circuit 58. The START circuit is of similar construction to the circuit of FIG. 1 and similar components in the two circuits have been given the same numerical references.

In order to improve the current handling capacity of the START circuit 57, the transistors 52 and 54 of FIG. 1 have been replaced by pairs of transistors 12 and 13, and 31 and 32 respectively. The transistors 31 and 32 are connected as a Darlington pair, a resistor 34 being connected between the emitter electrodes of the transistors to ensure that the transistor 32 is cut-off when the transistors 12 and 13 are conducting.

The operation of the transistors 12 and 13 is controlled by transistors 10 and 11, the base electrode of the transistor 10 being connected to an input terminal 14 via a series network consisting of a diode 16 and a capacitor 17. The START pulses, which in this case are negative-going, are applied to the terminal 14. The capacitor 17 forms the capacitive portion of a C–R network whose resistive portion is provided by a resistor 20 connected to a 50 volt supply line 25. A discharge path for the capacitor 17 is provided by a resistor 18 connected to a 5 volt supply terminal 19. A positive bias for the transistor 10 is provided by the resistor 20 whose value is selected so that the transistor 10 will conduct only during the absence of the START pulse. A parallel network consisting of a resistor 22 and a capacitor 23 connects the collector electrode of the transistor 11 to the junction of the coil 24 and the capacitor 29.

In addition to the signal input terminal 14 there is provided a signal input terminal 35 for receiving negative-going pulses (HOLD pulses) to control the operation of transistors 36 and 37. The base electrode of the transistor 36 is connected through a diode 15 and a resistor 38 to the +50 volt supply line 25 and through a resistor 39 to a −30 volt supply terminal 21. During the absence of the HOLD pulse, the terminal 35 is at a positive voltage, drive current for the transistor 36 then being provided through the resistor 38. When the HOLD pulse is applied, the voltage at the terminal 35 falls to zero, the diode 15 and the resistor 39 then ensuring that an adequate negative bias is applied to the transistor 36 to maintain it cut-off.

The transistor 37 is connected to the coil 24 through a parallel network having in one arm a resistor 43 while the other arm consists of a diode 44, a capacitor 45 and a diode 46 serially connected with one another and a resistor 47 shunting the diode 46. Connected between the diode 44 and the base electrode of a transistor 48 is a diode 40. A discharge path for the capacitor 45 is provided by the diode 46, the coil 24, transistors 48 and 49 connected as a Darlington pair and a diode 50. A resistor 51 is provided to prevent operation of the transistor 49 when the transistor 37 is conducting.

A Zener diode 41 is connected between the coil 24 and earth to limit the voltage developed across the transistors 12, 13 and 37.

In operation, START and HOLD pulses having coincident leading edges are applied to the terminals 14 and 35 respectively. The START pulse cuts-off the transistor 10 to allow the transistor 11 to conduct and drive the transistors 12 and 13 into saturation. Similarly the HOLD pulse cuts-off the transistor 36 to allow the transistor 37 to conduct. The transistors 12, 13 and 37 thus combine to provide a large current flow through the coil 24. As previously described, the current flowing through the transistors 12 and 13 also flows through the parallel network of the capacitor 29, the resistor 28 and the diode 30 to charge the capacitor. In similar manner the current flowing through the transistor 37 also flows through the parallel network of the resistor 43 the diode 44, the capacitor 45 and the resistor 47 to charge the capacitor 45.

Figure 4:
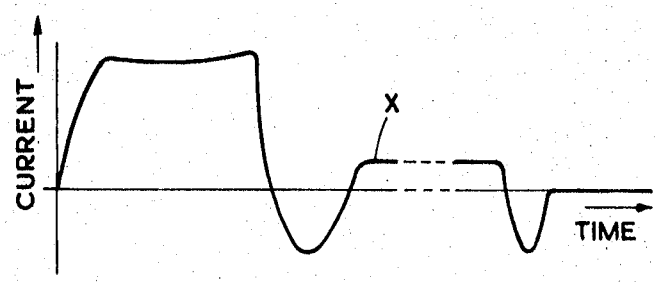
FIG. 4 shows curves used to explain the operation of FIG. 3.
Figure 4:
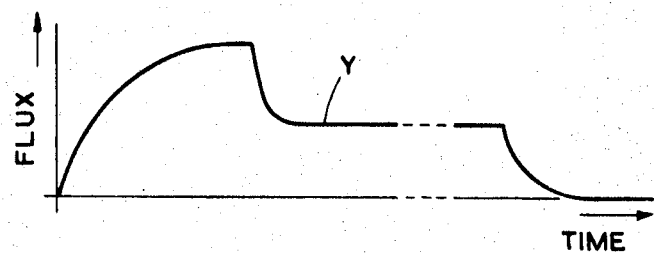

The current flowing through the coil and the resulting flux in the electromagnetic clutch or the electromagnetic brake increase, as shown in FIG. 4, until a period of approximately 3 msecs. has elapsed to enable the flux to attain a level at which the clutch or brake is operated. The START pulse is then removed to allow the transistor 10 to conduct and cut-off the transistors 11 to 13 to cause the current through the coil 24 to fall rapidly as shown in FIG. 4.

When the transistors 12 and 13 are cut-off, the diode 27 is released, current then flowing through the resistor 42 to the base of the transistor 31 to cause it to conduct. This in turn causes the transistor 32 to conduct, the voltage at the junction of the diodes 30 and 33 then being equal to approximately +50 volts. The voltage at the junction of the capacitor 29 and the coil 24 is therefore positive with respect to the voltage on the line 25 by an amount equal to the voltage developed across the capacitor during charging. The capacitor 29 now discharges through the coil 24 to provide a reverse current flow their to initiate a rapid reduction of the flux in the clutch or brake to a level Y as shown in FIG. 4 which is arranged to be just sufficient to maintain the operation of the clutch or brake. At the end of the discharge period of the capacitor 29, the current through the coil 24 tends to return to a level X which is determined by the current flow through the transistor 37, the flux then being maintained constant at the level Y.

When it is required to de-energise the clutch or brake, this is effected by removing the HOLD pulse from the terminal 35 to allow the transistor 36 to conduct to switch-off the transistor 37. This releases the diode 40 to enable the current flow through the resistor 26 to turn-on the transistor 48, and cause transistor 49 to conduct providing a voltage of approximately +50 volts at the junction of the diodes 44 and 50. The capacitor 45 now discharges through the coil 24 via the diode 46 to provide a large reverse current in the coil 24 as shown in FIG. 4 to initiate a rapid decrease in the flux to zero and thereby render the electromagnetic clutch or the electromagnetic brake inoperative.

By such an arrangement the saving in power is considerable. This is particularly the case where the HOLD period is very much longer than the START period. For example, in high speed line printers a requirement often exists for a HOLD period which is many hundreds of times greater than the START period.

Various modifications may be made without exceeding the scope of the invention. For example the control circuits of FIGS. 1 and 3 may be used to control an electromagnetic clutch or an electromagnetic brake for drive arrangements in apparatus other than high speed printers. Also the control circuits may be used to control electromagnetic devices other than electromagnetic clutches and brakes.

I claim:

1. An electric control circuit for an electromagnetic device, including a coil, a first means for energising the coil of the device to a predetermined first level to operate the device, a second means for subsequently providing a reverse current flow through the coil to reduce the level of energisation of the coil to a predetermined second level below said first level and a third means for maintaining the level of energisation of the coil at said predetermined second level and for subsequently providing a reverse current flow through said coil to render the device inoperable.

2. An electric control circuit according to claim 1, in which the first means and the second means have a common capacitor which is charged when the first means is operated and discharged through the coil on operation of the second means.

3. An electric control circuit according to claim 2, wherein the first means includes:
an energising circuit for the coil which includes the said capacitor, and
a first controlled impedance device rendered operative by a control signal to energise the coil and charge the capacitor, and
the second means includes:
a discharge circuit for the capacitor including the coil, and
a second controlled impedance device rendered operative when the first controlled impedance device is rendered inoperative to discharge the capacitor through the coil.

4. An electric control circuit according to claim 3, in which the first controlled impedance device is serially connected with the capacitor and the coil between supply lines with the first controlled impedance device and the coil being connected directly to respective supply lines, and the second controlled impedance device is connected between the supply line to which the coil is connected and the end of the capacitor remote from the coil.

5. An electric control circuit according to claim 1, including:
a first capacitor which is common to the first means and the second means and which is charged when the first means is operated and discharged through the coil an operation of the second means, and
a second capacitor which is included in the third means and which is charged during the period when the first capacitor is charged and discharged through the coil when the third means is operated to de-energise the coil.

6. An electric control circuit according to claim 5, wherein the first means includes:
a first energising circuit for the coil which includes the first capacitor, and
a first controlled impedance device operable by a first control signal to energise the coil and charge the first capacitor,
the second means includes
a discharge circuit for the first capacitor including the coil, and
a second controlled impedance device operable when the first controlled impedance device is rendered inoperative to discharge the capacitor through the coil, and
the third means includes
a second energising circuit for the coil including the second capacitor, and
a third controlled impedance device operable by a second control signal to energise the coil and charge the second capacitor, and
a discharge circuit for the second capacitor including the coil, and
a fourth controlled impedance device operable when the third controlled impedance device is rendered inoperative to discharge the second capacitor through the coil.

References Cited

UNITED STATES PATENTS

| | | | |
|---|---|---|---|
| 3,025,411 | 3/1962 | Rumble | 317—123CD |
| 3,064,165 | 11/1962 | Kennedy | 317—151X |
| 3,154,727 | 10/1964 | Hulls | 317—151X |

LEE T. HIX, Primary Examiner

U.S. Cl. X.R.

317—151; 323—4